United States Patent
Schubert et al.

(10) Patent No.: US 8,692,399 B2
(45) Date of Patent: *Apr. 8, 2014

(54) METHOD FOR OPERATING A WIND POWER PLANT HAVING A DOUBLY-FED ASYNCHRONOUS MACHINE AND WIND POWER PLANT HAVING A DOUBLY-FED ASYNCHRONOUS MACHINE

(75) Inventors: Thomas Schubert, Ellerau (DE); Uwe Bellgardt, Rostock (DE)

(73) Assignee: Nordex Energy GmbH, Norderstedt (DE)

( * ) Notice: Subject to any disclaimer, the term of this patent is extended or adjusted under 35 U.S.C. 154(b) by 720 days.

This patent is subject to a terminal disclaimer.

(21) Appl. No.: 12/936,089

(22) PCT Filed: Apr. 2, 2009

(86) PCT No.: PCT/EP2009/002411
§ 371 (c)(1),
(2), (4) Date: Dec. 14, 2010

(87) PCT Pub. No.: WO2009/121596
PCT Pub. Date: Oct. 8, 2009

(65) Prior Publication Data
US 2011/0095532 A1     Apr. 28, 2011

(30) Foreign Application Priority Data
Apr. 2, 2008 (DE) .......... 10 2008 017 715

(51) Int. Cl.
H02P 9/04 (2006.01)

(52) U.S. Cl.
USPC ............... 290/44; 700/290; 361/20

(58) Field of Classification Search
USPC ............... 700/290; 290/44; 361/20
See application file for complete search history.

(56) References Cited

U.S. PATENT DOCUMENTS

2007/0177314 A1   8/2007   Weng et al.

FOREIGN PATENT DOCUMENTS

WO   2004/067958 A1   8/2004
WO   2005/027301 A1   3/2005

OTHER PUBLICATIONS

Manoj R. Rathi; Ned Mohan: A Novel Robust Low Voltage and Fault Ride Through for Wind Turbine Application Operating in Weak Grids. Department of Electrical and Computer Engineering, Univ. Of Minnesota.
I. Erlich; H. Brakelmann: Integration of Wind Power into the German High Voltage Transmission Grid. Univ. Duisburg-Essen, 47057, Duisburg, Germany.

*Primary Examiner* — Tejal Gami
(74) *Attorney, Agent, or Firm* — Vidas, Arrett & Steinkraus

(57) ABSTRACT

A wind energy plant and method for operating it, the plant having a doubly-fed asynchronous machine, a grid-sided converter and a generator-sided converter both being controlled by a control means. In case of a grid fault the converters are controlled by at least one control module which (i) controls the torque and/or the active power and (ii) controls the reactive current and/or the reactive power.

19 Claims, 5 Drawing Sheets

METHOD FOR OPERATING A WIND POWER PLANT HAVING A DOUBLY-FED ASYNCHRONOUS MACHINE AND WIND POWER PLANT HAVING A DOUBLY-FED ASYNCHRONOUS MACHINE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a method for operating a wind energy plant with a doubly-fed asynchronous machine and to a wind energy plant with a doubly-fed asynchronous machine.

From WO 2005/027301 A1 a method is known for operating a frequency converter for a generator. The method relates to a wind energy plant with a frequency converter which comprises a converter connected to the generator and a converter connected to the grid. Upon considerable decrease of the grid voltage, the method provides that the voltage in an intermediate link between the converters is reduced and that an output current of the grid-sided converter is increased. In addition, the operating frequency for controlling the grid-sided converter can be reduced in order to increase the output current of the grid-sided converter.

From WO 2004/067958 A1 a generator for a wind energy plant is known comprising a low-voltage control for going through grid faults. The control is provided in order to reliably feed power into the grid, wherein in particular the grid codes of the energy supply companies shall be taken into account. The requirements are denoted "low voltage ride through" (LVRT) and demand that a wind energy plant shall continue to feed synchronously into the electric grid if a voltage drop occurs in the grid. In order to comply with these requirements, it is proposed to vary the pitch angles of one or more rotor blades when a voltage drop occurs.

In the past, ever new grid codes for wind energy plants were defined by the energy supply companies, putting specific emphasis on the FRT-characteristics ("fault ride through") of the wind energy plants. FRT-characteristics of a wind energy plant denotes the wind energy plant's ability to pass through a grid fault without shutdown or disconnection. Numerous different FRT-variants exist, again and again making adaptation of the control of the wind energy plant a necessity. This over and over again requires a redesign of the control of the wind energy plant—in particular of the control of the converters—and a development of new control methods. As a result of the development time and the subsequent testing of the newly adapted control, delays and costs are generated, conflicting with a flexible application of the wind energy plant.

From I. Erlich et al., "Integration of wind power into the German high voltage transmission grid" published in Power Engineering Society General Meeting, 2007, IEEE, Jun. 24, 2007-Jun. 26, 2007, pages 1 to 8, it is known for a doubly-fed asynchronous machine for a wind energy plant to control the rotor-sided converter and the grid-sided converter each with individual electrical parameters. Further, it is known from this document that a disconnection of the asynchronous machine from the grid is allowed only if the grid voltage falls below a predetermined voltage-time-characteristic curve.

The invention is based on the problem to provide a method for operating a wind energy plant with a doubly-fed asynchronous machine, and such a wind energy plant, which can easily be adapted to different FRT-requirements.

The problem is solved by the method with the features of claim 1. The problem is also solved by a wind energy plant with the features of claim 18. Advantageous aspects of the invention are subject to the dependent claims.

BRIEF SUMMARY OF THE INVENTION

The inventive method serves to operate a wind energy plant with a doubly-fed asynchronous machine, the wind energy plant comprising grid-sided and a generator-sided converter. Preferably, the converters are connected by a direct current link. Further, according to the invention, there is provided a control means controlling the converters. The inventive method in the regular operating mode comprises the step that the converters of the wind energy plant are controlled by the control means by means of command variables. According to the invention, in case of a grid fault, the converters are controlled by at least one control module, which controls the torque and/or the active power and the reactive current and/or the reactive power by means of command variables such that a disconnection of the asynchronous machine from the network will be performed only if the grid voltage falls below a predetermined voltage-time-characteristic curve. According to the invention, the shape of the voltage-time-characteristic curve is determined by a plurality of pre-selectable parameters in the at least one control module. The method uses a first command variable function which in case of fault provides a command variable for the torque and/or the active power. In case of fault, the first command variable function allows to provide command variables for the control at one or both converters. The control of the converters is performed in regular operating mode as well as in the case of fault through the command variables, so that for the converters, there is no structural difference in how they are controlled. The inventive method provides that the first command variable function for the torque and/or the active power comprises at least to basic functions. Of the basic functions, there is a first basic function determining the time progression of the set point for the torque and/or the active power following the occurrence of a fault, while the second basic function determines the time progression of the set point for the torque and/or the active power after completion of the fault. In this design of the control module for the first command variable function, the control module is divided into two basic functions in order to allow to more easily adapt the control module to different FRT-requirements. According to the invention, there is further provided a second command variable function which provides the set point for the reactive power and/or reactive current. The second command variable function comprises two basic functions, a third basic function thereof determining the time progression of the set point for the reactive power and/or reactive current following the occurrence of a fault, and a fourth basic function thereof determining the time progression of the set point for the reactive power and/or reactive current after completion of the fault.

In the inventive method, in addition to the conventional control means which controls the feed-in into the grid in a way known as such, there are provided at least two command variable functions which in the case of fault completely take over the control of the converters by means of command variables in order to comply with the FRT-requirements of the grid code. When there is a change of the grid requirements, the advantage of such a modular control of the wind energy plant is that, starting from the control in the regular operating mode, it is no longer necessary to re-engineer the entire control, but only to adapt one or a plurality of command variable functions with their basic functions for the case of fault. Because the voltage-time-characteristic curve can be parameterized, it is made sure that the command variable functions for the adaptation to different FRT-requirements can easily be adapted by a suitable selection of the parameters. All in all, using a modular control which can be parameterized allows applying the command variable functions following a parameterization without interfering with the control processes. In this way, the development times and the necessary change-over times for a change in the FRT-requirements can be reduced considerably.

According to a preferred aspect the first command variable function with a torque function and/or power function provides a torque set point and/or a power set point for the generator-sided converter. This advantageous aspect is based on the fact that in the FRT-requirements of the grid code, there are also defined requirements to the active power generation (P) of the wind energy plant during and following grid faults. For the active power (P) the simple relation $$P = 2\pi \cdot n \cdot M$$

applies, wherein n is the rotation speed and M the torque or the air-gap torque, respectively. In order to comply with possible given active power demands in a case of fault, defining a separate command variable function for the corresponding torque function in the case of fault has proven to be of advantage.

According to a preferred aspect, in the case of fault the second command variable function provides a set point for the torque and/or the active power to the grid-sided converter.

In a preferred aspect, the grid voltage is measured and a fault is detected if the grid voltage falls below a predetermined discrimination threshold. A fault will be detected by the control means if the grid voltage falls by a predetermined absolute value so that the grid voltage falls short of a discrimination threshold for the case of fault. In order to prevent an untimely release of the case of fault, a fault will be detected only if the grid voltage falls below the threshold at least for a predetermined duration. The predetermined duration as well as the value of the threshold are parameters that can be set in the control dependent on the requirements of the grid code.

According to an alternative aspect it is possible that a grid fault will be detected if a rotor current and/or an intermediate link voltage rises above a predetermined threshold. Therein, the rotor current is the current flowing into the electric circuit of the rotor. The intermediate link voltage is the voltage present in the direct current link between the generator-sided and the grid-sided converters.

Preferably, the first basic function in a first time interval reduces the torque set point and/or active power set point preferably to a value close to zero, and in a second, subsequent time interval the set point is increased to a predetermined minimum value. Advantageously, the minimum value is defined by parameters in the control module, so that it can easily be adapted. Preferably, the set point of the first basic function is dependent on a grid voltage present in the case of fault. In a particularly preferred aspect, the dependency of the set point on the grid voltage and/or the predetermined minimum value of the first basic function is selected dependent on if a fault is present in all phases or in only one or two phases of the grid. That is, with regard to the parameters of the first basic function, it is distinguished whether a so-called symmetric fault or an asymmetric fault is present, wherein a fault in all three phases is denoted a symmetric fault and a fault affecting not all of the phases of the grid is denoted an asymmetric fault. As a result of the additional differentiation of symmetric and asymmetric faults for the use of the sets of parameters suitable to this end, the first basic function provides a large spectrum in order to easily adapt the control module to different FRT-requirements.

The second basic function, which determines the torque set point and/or the active power set point only after completion of the fault, begins at a predetermined point in time and increases the set point for the torque and/or the power starting from this point in time until it again corresponds to the nominal power and/or the nominal torque at a predetermined second point in time. For the second basic function as well, the first and second points in time preferably are pre-selectable parameters. The parameters for the first and second point in time can be defined in the control module dependent on the number and/or duration of the preceding faults.

By using the two basic functions of the first command variable function, the control module for the torque and/or active power set points can be adapted very easily to different voltage-time-characteristic curves.

In a particularly preferred aspect of the inventive method, the value of the second command variable function for the reactive current will be determined dependent on the absolute difference between the nominal grid voltage and the grid voltage during the fault. In this way it is made sure that the wind energy plant will deliver the necessary contribution to support the grid in the case of fault. Further, it may be provided that the maximum set point for the reactive current during the fault is limited to a predetermined maximum value. By using the third and fourth basic functions for the second command variable function, it is possible to adapt the second command variable function to different voltage-time-characteristic curves as well.

According to the invention, the problem is also solved by a wind energy plant with a doubly-fed asynchronous machine, the wind energy plant comprising a grid-sided converter, a generator-sided converter and a control means controlling the converters in regular operating mode by means of command variables. The control means of the invention comprises a fault detection module which in case of a grid fault triggers a control of the converters by means of at least one control module. The at least one control module controls the converters by means command variables such that a disconnection of the asynchronous machine from the grid does not happen as long as the grid voltage does not fall below a predetermined voltage-time-characteristic curve. By means of the command variables, on the one hand a torque and/or an active power and on the other hand a reactive current and/or a reactive power is provided to the converters. The control of the inventive wind energy plant consists of a fault detection module and at least one control module in order to react to a fault in the grid, wherein the modular design of the control allows for an easy adaptation to different FRT-requirements. According to the invention, the shape of the voltage-time characteristic curve is defined by pre-selectable parameters in the at least one control module. In this way, the modular control of the inventive wind energy plant can easily be re-parameterized and adjusted according to the FRT-requirements of the grid operators. First and second command variable functions comprise a plurality of pre-selectable parameters which define the time progression of the set points.

Preferably, the inventive plant comprises a switch which is controlled by the fault detection module in order to disconnect the converters from the control means for the regular operating mode, for example a plant management, and to connect them to the control modules.

Preferably, the command variable functions again are divided into basic functions, one of them determining the set points during the fault (first and third basic functions) and another one after the fault (second and fourth basic functions).

BRIEF DESCRIPTION OF THE SEVERAL VIEWS OF THE DRAWINGS

In the following a preferred embodiment of the invention is explained in greater detail.

DETAILED DESCRIPTION OF THE INVENTION

Figure 1:
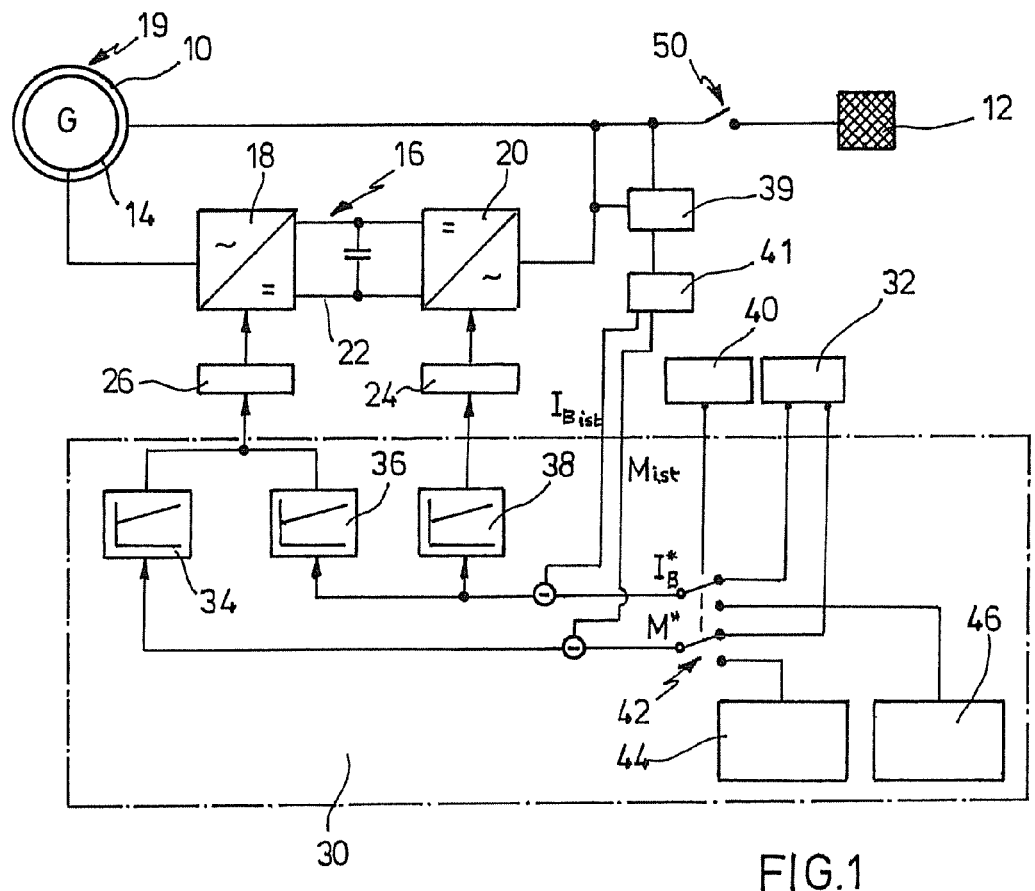
FIG. 1 shows the inventive design of a modular control for a doubly-fed asynchronous machine.

While this invention may be embodied in many different forms, there are described in detail herein a specific preferred embodiment of the invention. This description is an exemplification of the principles of the invention and is not intended to limit the invention to the particular embodiment illustrated In a wind energy plant, the mechanical power of the rotor is transferred by the power train to the generator and converted therein into electric power. Therein, the generator 19 is coupled to the grid by two electric circuits. The stator circuit 10 is coupled to the grid 12 directly. The rotor circuit 14 is coupled to the grid indirectly, through the frequency converter 16. The task of the frequency converter 16 is to regulate the generator 19. Generally speaking, the energy is flowing from the mechanical energy of the rotor through the generator into the electric grid. Grid faults, for example voltage drops, as a result of the connection of the generator to the grid take effect on the wind energy plant. The grid codes for wind energy plants therefore provide specific criteria for going through a grid fault without shutdown or disconnection from the grid of the wind energy plant. This behaviour of the wind energy plant is also named "fault ride through" ("FRT").

Generator 19, frequency converter 16 and power train (not shown) as main components of the wind energy plant are coupled to the electric grid indirectly or directly. Dependent on the activities in the grid, the main components are therefore subject to mechanical loads. For these reasons, it is necessary to define for the case of fault the FRT-behaviour and the control of the wind energy plant, respectively, in order to bring in line the mechanical and electrical loads of the wind energy plant with the requirements of the grid code.

Figure 2:
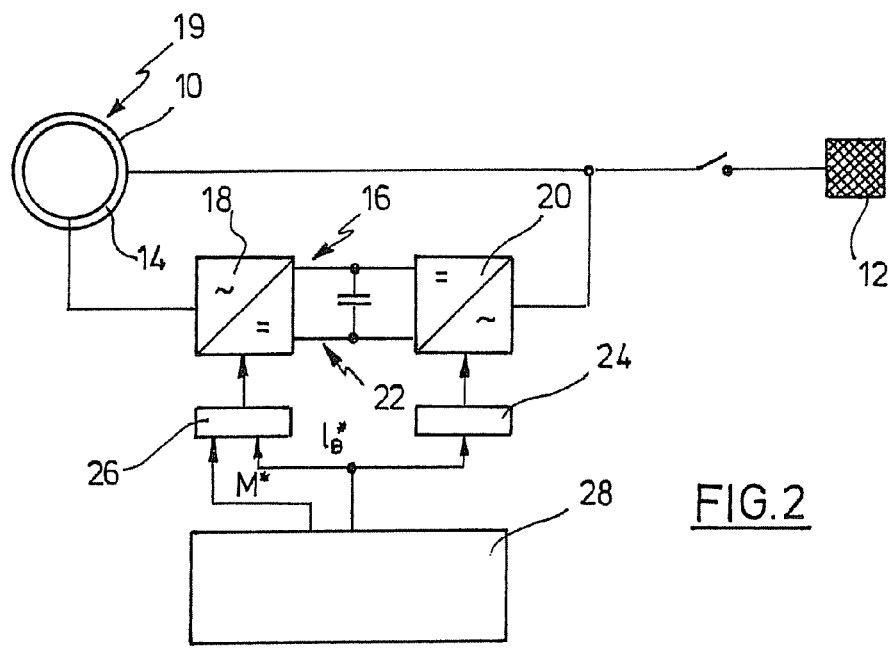
FIG. 2 shows the conventional control of a doubly-fed asynchronous machine.

Before describing the inventive control of the wind energy plant in greater detail, the conventional control of a wind energy plant shall be illustrated briefly by means of FIG. 2. As mentioned earlier, the stator circuit 10 is directly connected to the grid 12. The rotor circuit 14 is also connected to the grid 12 through the frequency converter 16. The frequency converter 16 has a generator-sided converter 18 and a grid-sided converter 20. The converters 18, 20 are connected to one another by a direct current link 22. Each of the converters 18, 20 is controlled by a pulse width modulation 24, 26. The control 28 of the frequency converter 16 provides a set point for the torque M* and a set point for the reactive current $I_B^*$ to the generator-sided converter 18.

If in the following it is referred to torque M*, this may always be replaced by a set point for the active power P*. As well, the reactive current $I_B^*$ may always be replaced by a set point for the reactive power Q*.

The control 28 provides a set point for the reactive current $I_B^*$ to the grid-sided converter 20.

With the control shown in FIG. 2, it is possible to separately adjust or regulate the reactive power and the torque, respectively. The set points M* for the torque and $I_B^*$ for the reactive current serve as command variables and are generated within the control 28 of the frequency converter 16. Subsequently, pulse shapes corresponding to these set points are generated, leading to a three-phase voltage for the rotor of the generator, causing the generation of a reactive power and a torque in the generator corresponding to the command variables. By means of the controllability of the asynchronous machine in terms of torque and reactive power, the technical prerequisites for reacting to the FRT-requirements are established.

Because of the high real-time demands made on the FRT-control, these need to be implemented close to the processes. Against this background, the FRT-methods up to now always were integral parts of the control 28.

In the inventive control as shown in FIG. 1, another design and another functionality of the control arises. For a better overview, components in FIG. 1 serving the same function as in the conventional control according to FIG. 2 are given the same reference numerals. In the inventive control 30, the set points M* and $I_B^*$ are applied as command variables to the control 30 in the regular operating mode. In FIG. 1, a control means 32 is provided for the regular operating mode. The control means 32 can be provided with general variables of the plant management from the outside (not shown), for example by a plant management of the wind energy plant.

The set points M* and $I_B^*$ determined by the control means 32 are applied to the converters 18, 20 by means of controllers 34, 36, 38, wherein the pulse shapes required for controlling the converters are generated as well by pulse width modulation 24, 26. The controllers 34, 36 and 38 perform a comparison with the actual values for the torque $M_{act}$ and the reactive power $I_{Bact}$. In order to determine the actual values, a measurement means 39 measures for example the rotor current and the stator voltage. In a transformation means 41, these measured quantities of the actual values for the torque $M_{act}$ and the reactive power $I_{Bact}$ are getting transformed. The transformation is performed dependent on the rotation speed of the generator (not shown). The controlled process variable for the controllers 34 to 38 is determined from the difference between actual value and set point.

The controlled process variable for the set point of the torque M* is applied to the generator-sided converter 18, whereas the controlled process variable for the set point of the reactive current $I_B^*$ is applied to both converters 18, 20.

In FIG. 1, a fault detection module 40 is provided which disconnects the converters 18, from the set points of the control means 32 and connects them to two control modules 44, 46 by means of a switch 42.

Figure 3:
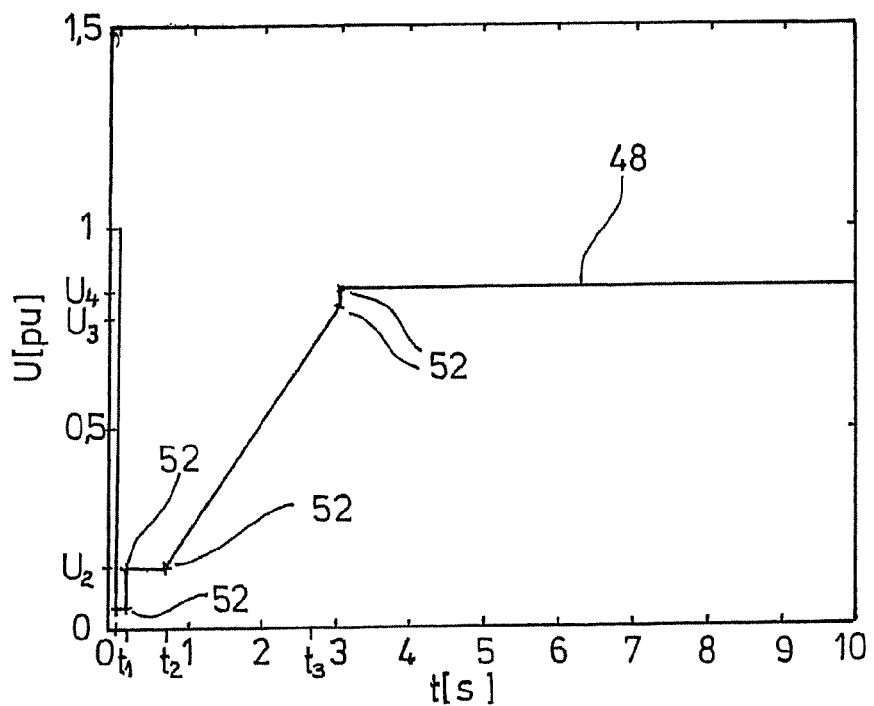
FIG. 3 shows a voltage-time-characteristic curve defined by parameters.

From FIG. 1 it becomes already apparent that by switching over of the fault detection module 40 it is possible to use a conventional control for the converters 18, 20 which is working independently of specific requirements for the case of a grid fault. Only in the case of fault, a switching over is performed by the switch 42 and the control modules 44, 46 take over the task of the control means 32. Of the control modules, control module 44 is designed as a torque function, that is as a first command variable function, which in the case of fault provides a set point for the torque M*. The control module 46 is designed as a current function which in the case of fault provides a set point for the reactive power and/or the reactive current $I_B^*$. In each of the control modules 44 and 46, there is retained a voltage-time-characteristic curve 48 as exemplified in FIG. 3. The voltage-time-characteristic curve of FIG. 3 is defined by freely selectable support points 52 which in the present example are connected by lines. The voltage-time-characteristic curve in FIG. 3 describes a so-called "voltage funnel", wherein the requirements of the grid operators say that a disconnection of the wind energy plant from the grid is to be avoided as long as the grid voltage is larger than the voltage described by the voltage-time-characteristic curve 48. For the doubly-fed asynchronous machine, this means that the switch 50 of FIG. 1 must remain closed.

The "voltage funnel" given by the voltage-time-characteristic curve 48 is characterized in that the wind energy plant in a very short time interval until t1 must remain connected to the grid even in view of a very extensive voltage drop. In a second time interval from t1 to t2, the wind energy plant may disconnect from the grid only if the grid voltage is below the voltage $U_2$. If the grid voltage does not increase again at least linearly to a voltage U3 in a time interval from t2 to t3, the plant may be disconnected from the grid. In a subsequent, longer period, the wind energy plant must be operated connected to the grid if the grid voltage is larger than voltage $U_4$. By means of the support points 52 exemplified as crosses in FIG. 3, it is possible to generally define the voltage-time-characteristic curve for the control. For example, suitable support points may set the voltages in the interval from t1 to t2 to a value defined by the grid code.

The control of the control modules 44 and 46 is performed such that the set points M* and $I_B^*$ are determined so that the wind energy plant does not disconnect from the grid and meets the detailed requirements of the grid operators.

Figure 4:
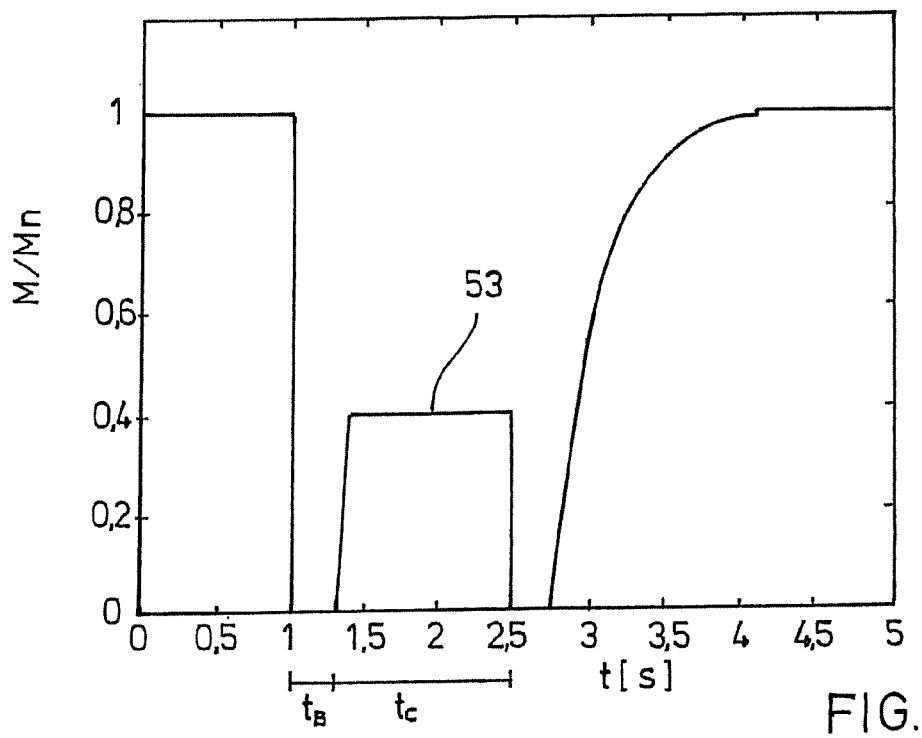
FIG. 4 shows the course of torque in the case of fault.

The progression of the first command variable function as torque function 53 of the control module 44 is shown as an example in FIG. 4. In a first time interval $t_B$—at the beginning of which the grid fault occurs—the set point for the torque is set to zero. In a second time interval $t_C$ the set point for the torque is set to about 40% of the nominal torque. In a subsequent time interval extending from about 2.5 seconds to 2.7 seconds, again a torque set point of zero is applied to the generator-sided converter 18. In a subsequent time interval, the set point for the generator-sided converter 18 is increased to the nominal value of the torque again, following approximately the course of an e-function. The torque function illustrated by FIG. 4 is dependent on the FRT-requirements as shown in the voltage-time-characteristic curve in FIG. 3. In order to better account for the torque function of FIG. 4 in the control module, the torque function is divided into two basic functions.

Figure 5:
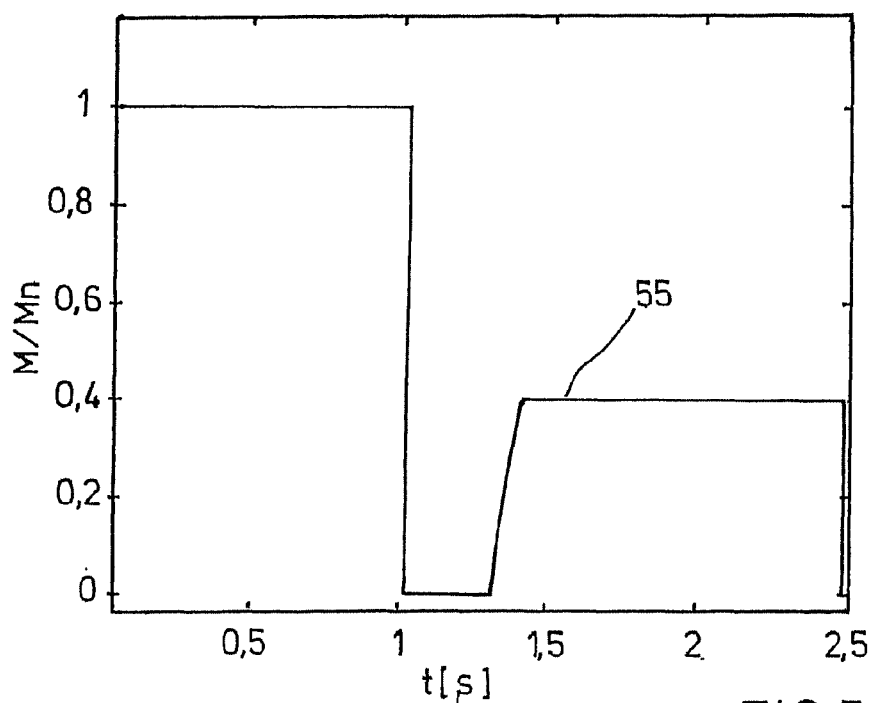
FIG. 5 shows the first basic function for the course of torque in the case of fault.

FIG. 5 shows a first basic function describing the course of the torque 55 following the occurrence of a fault. The first basic function determines that the torque is lowered to a value of zero at first, wherein the grid fault in FIG. 5 occurs at a point in time of t=1 s. After about 0.3 seconds, the set point for the torque is increased to a value of about 40% of the nominal torque. This value is retained in the control module and can be parameterized.

Figure 6:
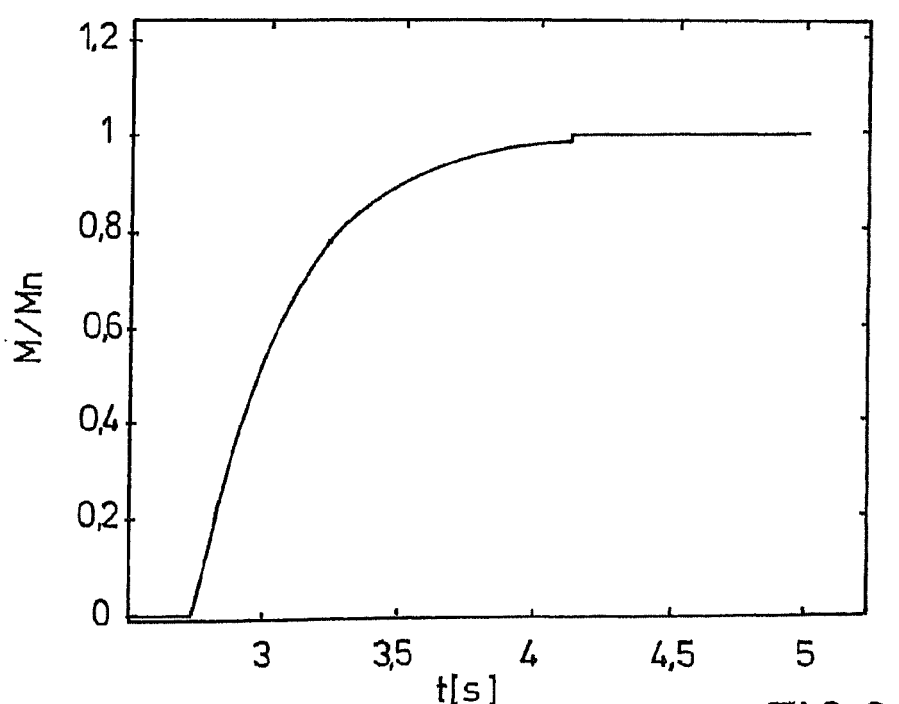
FIG. 6 shows the second basic function for the course of torque in the case of fault.
Figure 7A:
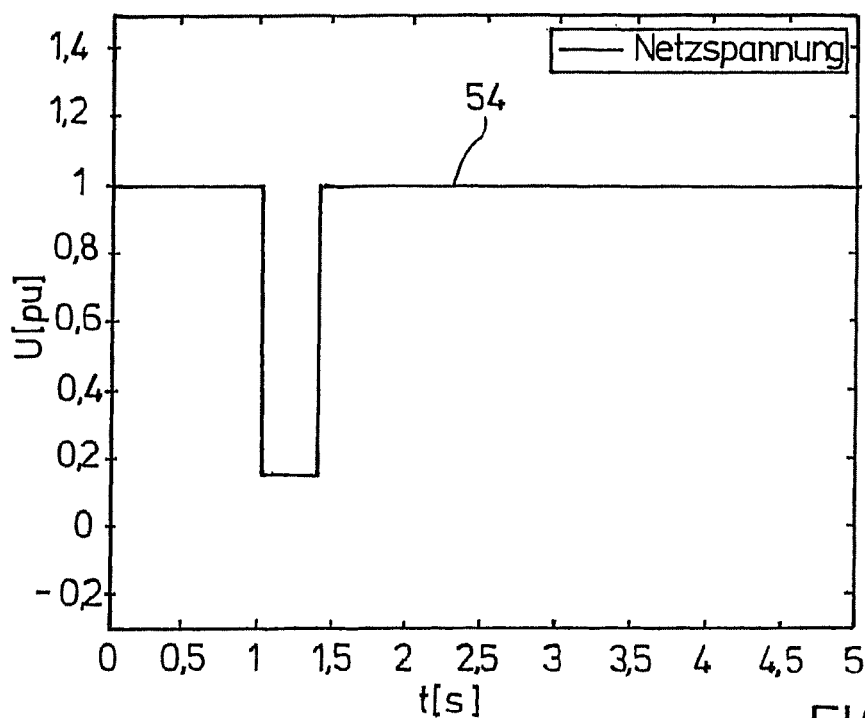
FIGS. 7a-7c show the course of grid voltage, reactive current and torque in the case of fault.
Figure 7B:
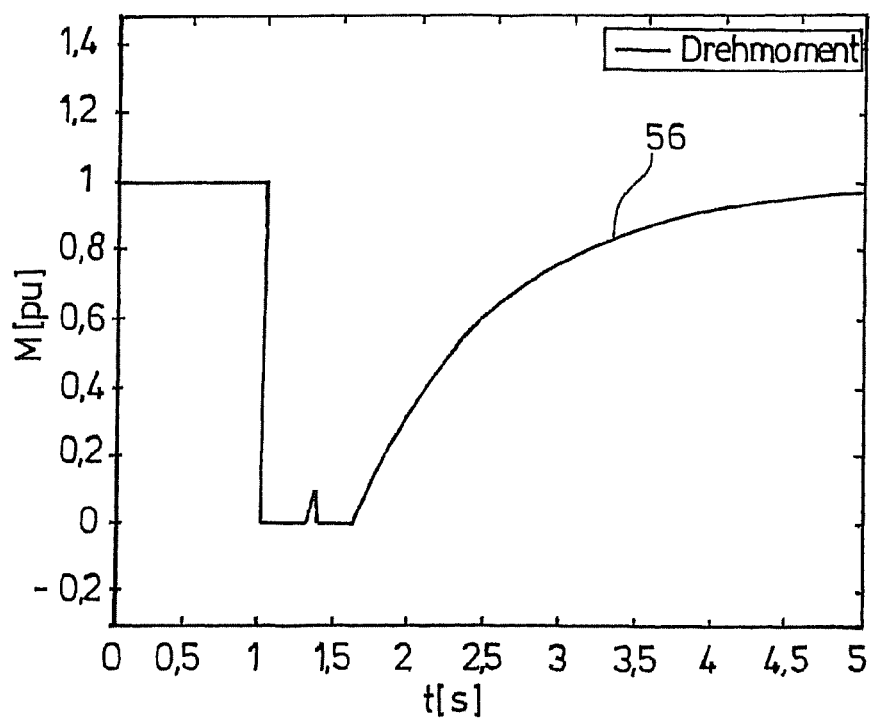
Figure 7C:
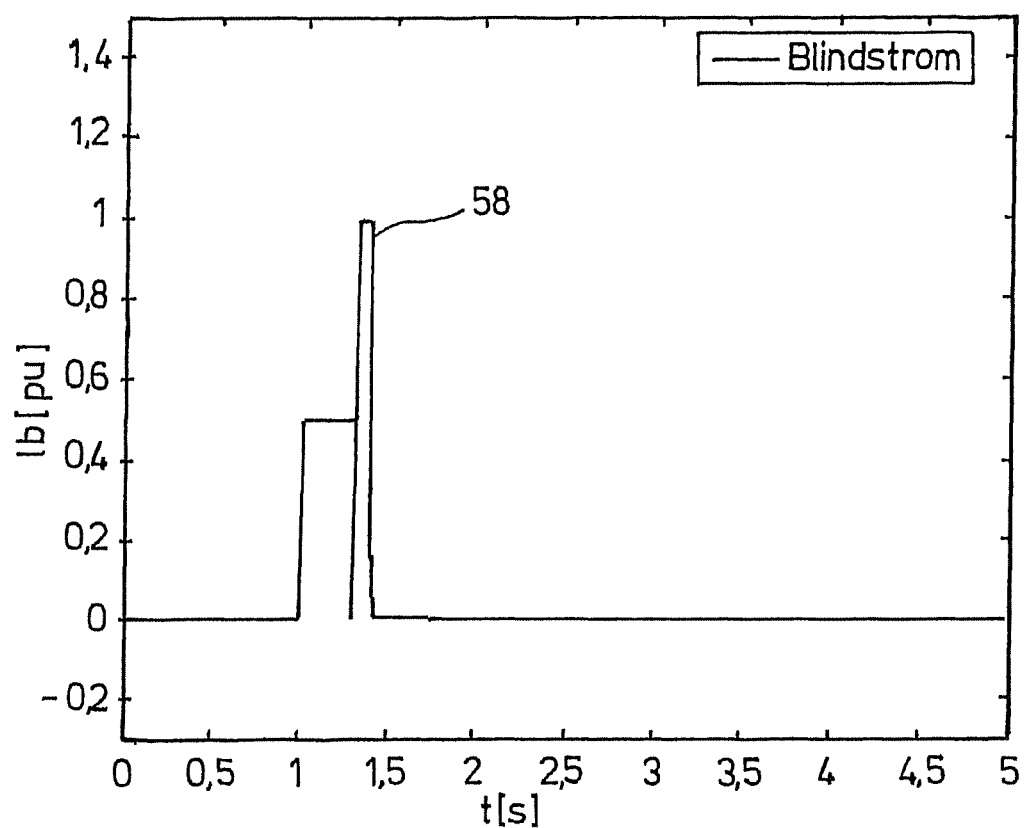

FIG. 6 shows the progression of the second command variable function as torque function after the occurrence of the fault. With reference to the occurrence of the fault, approximately after 1.7 seconds a parabolic increase of the torque set point to the nominal power is performed. When the first and second basic functions according to FIGS. 5 and 6 are combined with each other, it is possible to control the torque in the case of fault by the torque function as first command variable function of the control module 44 in order to avoid a disconnection from the grid and to comply with the detailed requirements of the grid operators, respectively. The second command variable function as a current function for the reactive current is divided into parameterized basic functions, which can be parameterized and combined with each other corresponding to the FRT-requirements, like the first command variable function. FIGS. 7a to c show the overall behaviour of the wind energy plant in a case of fault. In FIG. 7a, the grid voltage 54 is depicted, dropping at a point in time t=1 s for a duration of 0.375 seconds to a value of 15% of the grid voltage. In FIG. 7b it is clearly visible that the torque 56 of the wind energy plant is reduced to zero directly after the occurrence of the fault and increased again after about 0.3 seconds. With the ending of the reduced grid voltage, the torque of the wind energy plant is again lowered to zero, in order to be increased again to the nominal torque after a defined period of time. Approximately four seconds after the occurrence of the fault, the wind energy plant again reaches the nominal torque. The feed-in of the reactive current starts directly with the occurrence of the fault. In the time interval in which the torque initially lowered is increased again, for compensation an increased reactive current 58 is fed-in, which is reduced again with completion of the fault.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim 1f such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. Method for operating a wind energy plant having a doubly-fed asynchronous machine, a grid-sided converter and a generator-sided converter both being controlled by a control means, the method comprising the following steps:

in a regular operating mode the converters are controlled by the control means by means of command variables for the regular operating mode, in case of a grid fault the converters are controlled by at least one control module which (i) controls the torque and/or the active power and (ii) controls the reactive current and/or the reactive power by means of command variables such that a disconnection of the asynchronous machine from the grid will be performed only if the grid voltage falls below a predetermined voltage-time-characteristic curve, wherein the shape of the voltage-time-characteristic curve is configured by a plurality of pre-selectable parameters in the at least one control module, wherein at least one first command variable function is provided which in the case of fault provides a command variable for the torque and/or the active power and which comprises at least two basic functions, a first basic function thereof determining the set point for the torque and/or the active power following the occurrence of a fault, and a second basic function thereof determining the set point for the torque and/or the active power following completion of the fault, and wherein at least one second command variable function for the reactive current and/or the reactive power is provided which in the case of fault provides a command variable for controlling of at least one of the converters and which comprises at least two basic function, a third basic function thereof determining the set point for the reactive power and/or the reactive current following the occurrence of a fault, and a fourth basic function thereof determining the set point for the reactive power and/or the reactive current following completion of the fault.

2. Method according to claim 1, characterized in that in the case of fault the generator-sided converter is controlled according to the first command variable function.

3. Method according to claim 1, characterized in that in the case of fault the grid-sided converter and/or the generator-sided converter are controlled according to the second command variable function.

4. Method according to claim 1, characterized in that the grid voltage is measured and a fault is detected if the grid voltage falls below a predetermined discrimination threshold.

5. Method according to claim 4, characterized in that a fault is detected only if the grid voltage falls below the discrimination threshold for at least a predetermined time duration.

6. Method according to claim 1, characterized in that a fault is detected if a rotor current and/or an intermediate link voltage rises above a predetermined threshold.

7. Method according to claim 1, characterized in that the first basic function in a first time interval reduces the torque set point and/or active power set point, and in a second time interval increases the set point to a predetermined minimum value which is smaller than or equal to the nominal power or the nominal torque of the wind energy plant, respectively.

8. Method according to claim 7, characterized in that the predetermined minimum value can be parameterized.

9. Method according to claim 1, characterized in that the first basic function provides the torque set point and/or active power set point dependent on a grid voltage present in the case of fault.

10. Method according to claim 8, characterized in that the dependency on the grid voltage and/or the predetermined minimum value of the first basic function is selected dependent on if a fault is present in all phases or in only one or two phases of the grid.

11. Method according to claim 5, characterized in that the second basic function increases the set point for the torque and/or the power beginning at a first point in time until the set point corresponds to the nominal torque and/or the nominal power of the wind energy plant at a predetermined second point in time.

12. Method according to claim 11, characterized in that the first and the second points in time can be parameterized in the control module.

13. Method according to claim 11, characterized in that the first and the second points in time can be parameterized in the control module dependent on the number and/or the duration of the preceding faults.

14. Method according to claim 1, characterized in that the second command variable function will provide a time progression of the set point for the reactive current and/or the reactive power if the absolute difference between the nominal grid voltage and the grid voltage during the fault is larger than a predetermined difference value.

15. Method according to claim 14, characterized in that the second command variable function for the set point of the reactive current is determined dependent on the absolute difference between the nominal grid voltage and the grid voltage during the fault.

16. Method according to claim 14, characterized in that the maximum set point for the reactive power during the fault is limited to a predetermined maximum value.

17. Method according to claim 14, characterized in that the second command variable function and its parameters are selected dependent on if a fault is present in all phases or in only one or two phases of the grid.

18. Wind energy plant with a doubly-fed asynchronous machine, the wind energy plant comprising a grid-sided converter, a generator-sided converter and a control means controlling the converters by means of set points, characterized in that at least two control modules are provided, a first control module thereof providing a first command variable function for controlling the grid-sided and/or the generator-sided converter during a grid fault, a second control module thereof providing a second command variable function for controlling the grid-sided and/or the generator-sided converter during a grid fault, the control means comprises a fault detection module which triggers a control of the converters by means of at least one control module, wherein a voltage-time-characteristic curve is retained in the control modules and the control modules control the converters such that a disconnection of the asynchronous machine from the grid will be performed only if the grid voltage falls below a predetermined voltage-time-characteristic curve, and each control module comprises a plurality of pre-selectable parameters which define the shape of the voltage-time characteristic curve and/or of the command variable functions, further characterized in that the first command variable function comprises at least two basic functions, a first basic function thereof determining the set point for the torque and/or the active power following the occurrence of the fault and a second basic function thereof determining the set point for the torque and/or the reactive power following completion of the fault, and further characterized in that the second command variable function comprises at least two basic functions, a third basic function thereof determining the set point for the reactive power and/or reactive current following the occurrence of the fault and a fourth basic function thereof determining the set point for the reactive power and/or the reactive current following completion of the fault.

19. Wind energy plant according to claim 18, characterized in that a switch is provided which is controlled by the fault detection module, the switch disconnecting the converters from the control means and connecting the converters to the control modules.

* * * * *